(12) United States Patent
Lin

(10) Patent No.: US 11,947,467 B2
(45) Date of Patent: Apr. 2, 2024

(54) ELECTRONIC DEVICE AND OPERATION METHOD THEREOF

(71) Applicant: Nuvoton Technology Corporation, Hsinchu Science Park (TW)

(72) Inventor: Zong-Min Lin, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/564,130

(22) Filed: Dec. 28, 2021

(65) Prior Publication Data

US 2022/0253393 A1    Aug. 11, 2022

(30) Foreign Application Priority Data

Feb. 9, 2021   (TW) .................................. 110104914

(51) Int. Cl.
  *G06F 12/14*   (2006.01)
  *G06F 13/16*   (2006.01)

(52) U.S. Cl.
  CPC ...... *G06F 12/1433* (2013.01); *G06F 12/1416* (2013.01); *G06F 13/1694* (2013.01); *G06F 13/1689* (2013.01)

(58) Field of Classification Search
  CPC ............. G06F 12/1416; G06F 12/1425; G06F 12/1433; G06F 12/1441; G06F 12/145;
  (Continued)

(56) References Cited

U.S. PATENT DOCUMENTS

| | | | | |
|---|---|---|---|---|
| 5,901,328 A | * | 5/1999 | Ooe ..................... | G06F 12/1441 711/149 |
| 2011/0055458 A1 | * | 3/2011 | Kuehne ............... | G06F 12/0246 711/E12.001 |

(Continued)

FOREIGN PATENT DOCUMENTS

| | | |
|---|---|---|
| CN | 102012867 A | 4/2011 |
| CN | 110489052 A | 11/2019 |

(Continued)

OTHER PUBLICATIONS

Fast Secure Processor for Inhibiting Software Piracy and Tampering by Yang (Year: 2003).*

(Continued)

*Primary Examiner* — Paul M Knight
(74) *Attorney, Agent, or Firm* — Muncy, Geissler, Olds & Lowe, P.C.

(57) ABSTRACT

An electronic device includes a first memory controller, a second memory controller, and a memory access controller. The first memory controller stores setting information of a predetermined memory, wherein the predetermined memory is defined as an execute-only-memory. The second memory controller provides and sets an enabling register according to the setting information of the predetermined memory, and generates an enabling signal. The memory access controller accesses the first memory controller and the second memory controller to move the data of the predetermined memory to a predetermined memory space corresponding to the enabling register according to the enabling signal and the setting information of the predetermined memory.

10 Claims, 4 Drawing Sheets

(58) Field of Classification Search
CPC ...... G06F 3/062; G06F 3/0622; G06F 3/0623; G06F 3/0637; G06F 3/0659; G06F 3/0661; G06F 3/0679; G06F 3/068; G06F 21/62; G06F 21/6227
See application file for complete search history.

(56) References Cited

U.S. PATENT DOCUMENTS

| | | | | |
|---|---|---|---|---|
| 2011/0213912 | A1* | 9/2011 | Yeh | G06F 11/10 711/E12.001 |
| 2014/0281137 | A1* | 9/2014 | Circello | G06F 12/1425 711/103 |
| 2016/0283402 | A1* | 9/2016 | Schulz | G06F 11/3037 |
| 2018/0004418 | A1* | 1/2018 | Shanbhogue | G06F 3/0673 |
| 2019/0220419 | A1* | 7/2019 | Lin | G06Q 50/184 |
| 2020/0089894 | A1* | 3/2020 | Liu | G06F 3/0679 |
| 2021/0334213 | A1* | 10/2021 | Dorris | G06F 12/109 |

FOREIGN PATENT DOCUMENTS

| | | |
|---|---|---|
| TW | 201131578 A | 9/2011 |
| TW | 201504812 A | 2/2015 |

OTHER PUBLICATIONS

Architectural Support for Copy and Tamper Resistant Software by Lie (Year: 2000).*
What is a Cache Controller? by Spencer (Year: 2019).*
Handling the Problems and Opportunities Posed by Multiple On-Chip Memory Controllers by Awasthi (Year: 2020).*
XMP: Selective Memory Protection for Kernel and User Space by Proskurin (Year: 2020).*
UXOM: Efficient eXecute-Only Memory on ARM Cortex-My by Kwon (Year: 2019).*
Configurable Memory Security in Embedded Systems by Crenne (Year: 2013).*
Office Action dated Feb. 24, 2022 in TW Application No. 110104914 is attached, 6 pages.

* cited by examiner

ELECTRONIC DEVICE AND OPERATION METHOD THEREOF

CROSS REFERENCE TO RELATED APPLICATIONS

This application claims priority of Taiwan Patent Application No. 110104914, filed on Feb. 9, 2021, the entirety of which is incorporated by reference herein.

TECHNICAL FIELD

The present invention relates to an electronic device, and in particular it relates to an electronic device and an operation method thereof.

BACKGROUND

An execute-only-memory (XOM) is firmware protection technology that protects critical program code by defining the area of the execute-only-memory. By using the protection of the execute-only-memory, a part of a program memory space only supports a program execution, and no device may read back the contents of the memory.

In general, the execute-only-memory only exists in a block of a non-volatile memory (NVM), such that when the program code is burned to this block, this block is also recorded as having the function of the execute-only-memory at the same time. However, since the data access speed of non-volatile memory is slow, the proper operation during data access and the convenience of use may be affected. Therefore, how to increase the data access speed and the convenience of use has become a focus of technical improvements.

SUMMARY

An embodiment of the present invention provides an electronic device and an operation method thereof, such that the volatile memory may have the function of execute-only-memory, and the access speed of the memory and the convenience of use may be increased.

An embodiment of the present invention provides an electronic device, which includes a first memory controller, a second memory controller and a memory access controller. The first memory controller is configured to store setting information of a predetermined memory, wherein the predetermined memory is defined as an execute-only-memory. The second memory controller is coupled to the first memory controller, and configured to provide and set an enabling register according to the setting information of the predetermined memory, and generate an enabling signal. The memory access controller is coupled to the first memory controller and the second memory controller, and configured to access the first memory controller and the second memory controller to move data of the determined memory to a predetermined memory space corresponding to the enabling register according to the enabling signal and the setting information of the predetermined memory.

An embodiment of the present invention provides an operation method of an electronic device, which includes the following steps. A first memory controller is used to store setting information of a predetermined memory, wherein the predetermined memory is defined as an execute-only-memory. A second memory controller is used to provide and set an enabling register according to the setting information of the predetermined memory, and generate an enabling signal. A memory access controller is used to access the first memory controller and the second memory controller to move data of the determined memory to a predetermined memory space corresponding to the enabling register according to the enabling signal and the setting information of the predetermined memory.

According to the electronic device and the operation method thereof disclosed by the present invention, the first memory controller stores the setting information of the predetermined memory, wherein the predetermined memory is defined as the execute-only-memory. The second memory controller provides and sets the enabling register according to the setting information of the predetermined memory, and generates the enabling signal. The memory access controller accesses the first memory controller and the second memory controller to move the data of the predetermined memory to the predetermined memory space corresponding to the enabling register according to the enabling signal and the setting information of the predetermined memory. Therefore, the memory corresponding to the second memory controller may have the function of execute-only-memory, and the access speed of the memory and the convenience of use may be increased.

BRIEF DESCRIPTION OF DRAWINGS

The present invention can be more fully understood by reading the subsequent detailed description and examples with references made to the accompanying drawings, wherein.

DETAILED DESCRIPTION OF DISCLOSED EMBODIMENTS

In each of the following embodiments, the same reference number represents an element or component that is the same or similar.

Figure 1:
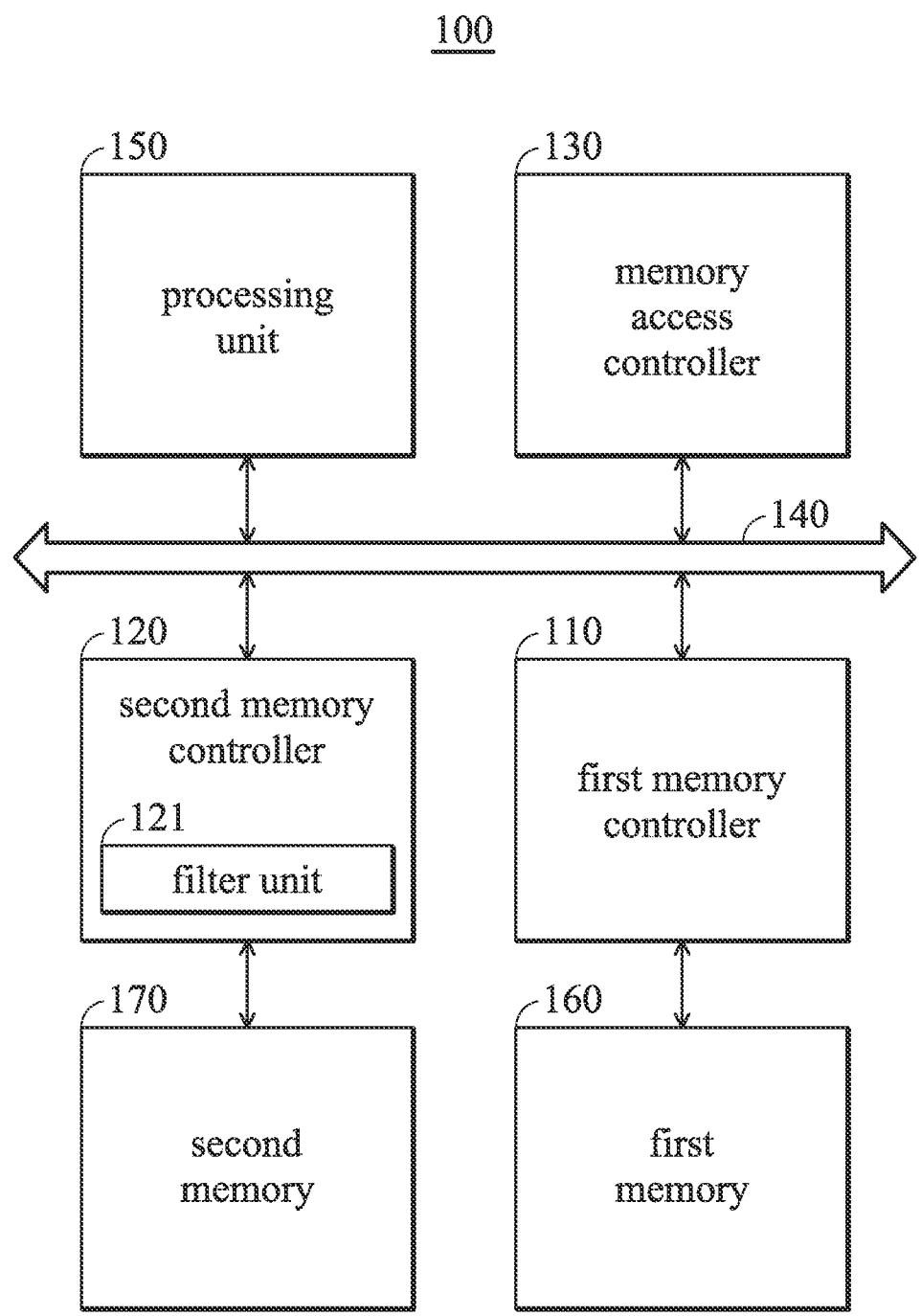
FIG. 1 is a schematic view of an electronic device according an embodiment of the present invention.

FIG. 1 is a schematic view of an electronic device according an embodiment of the present invention. Please refer to FIG. 1. The electronic device 100 may include a first memory controller 110, a second memory controller 120, a memory access controller 130 and a system bus 140. In the embodiment, the system bus 140 may be an advanced high performance bus (AHB), an advanced eXtensible interface (AXI) or a combination thereof, and the memory access controller 130 may be a direct memory access (DMA) device, but the embodiment of the present invention is not limited thereto.

The first memory controller 110 is coupled to the system bus 140. The first memory controller 110 may perform a data transmission through the system bus 140 and store setting information of a predetermined memory, wherein the predetermined memory is defined as an execute-only-memory. In the embodiment, the execute-only-memory may only allow an instruction-fetch operation, but not allow a data-access operation, so as to avoid network attacks or hackers and protect the critical program code.

Figure 2:
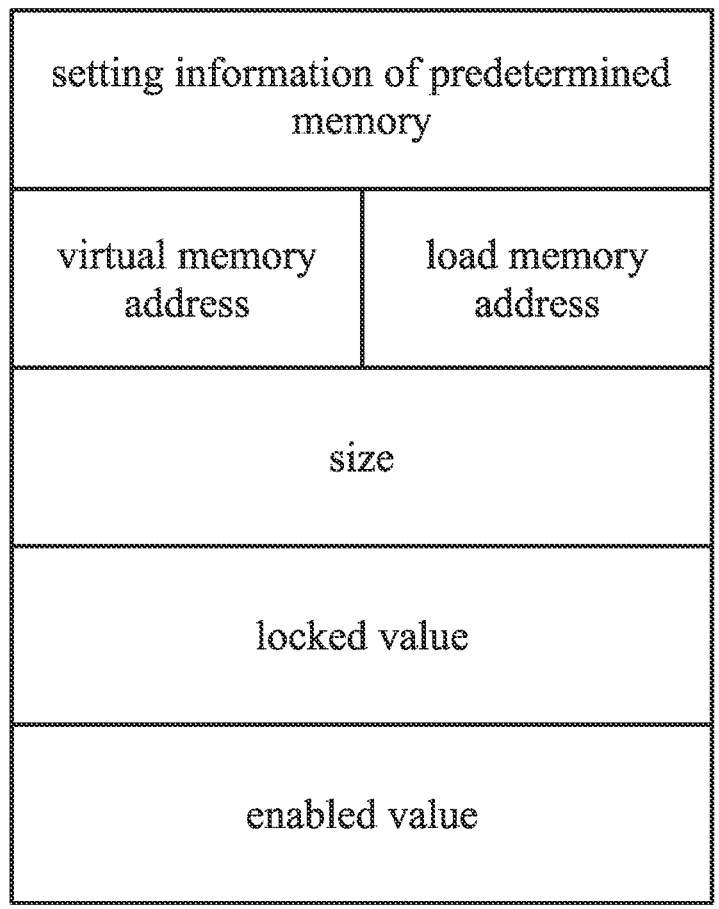
FIG. 2 is a schematic view of setting information of a predetermined memory according an embodiment of the present invention.

In addition, the first memory controller 110 may be a non-volatile memory (NVM) controller. Furthermore, the setting information of the above predetermined memory may include a virtual memory address (VMA), a load memory address (LMA), a size of the predetermined memory, a locked value and an enabled value), as shown in FIG. 2.

The virtual memory address is, for example, a base address where the program code of the predetermined memory is placed in the volatile memory. The load memory address is, for example, a base address where the program code of the predetermined memory is placed in the non-volatile memory.

The locked value and the enabled value are, for example, a setting value of 1-bit, but the embodiment of the present invention is not limited thereto. In the embodiment, the enabled value represents whether the setting of the predetermined memory is valid. For example, when the enabled value is, for example, a high logic level "1", the setting of the predetermined memory is valid, i.e., the predetermined memory has a read-only function. When the enabled value is, for example, a low logic level "0", the setting of the predetermined memory is invalid, i.e., the predetermined memory may have a read and write function.

The locked value may be used to provide the convenience of user developer. When the locked value is not set, the predetermined memory may still be accessed for data access, debugging, etc. When the locked value is set, the predetermined memory is active, i.e., the characteristic of the predetermined memory (e.g., the characteristic of the execute-only-memory) becomes effective. For example, when the locked value is set to, for example, a low logic level "0", it represents the predetermined memory having a read-only function. When the locked value is set to, for example, a high logic level "1", it represents the predetermined memory rejecting data access, i.e., the predetermined memory does not have read and writing functionality.

The second memory controller 120 is coupled to the system bus 140. The second memory controller is coupled to and communicates with the first memory controller 110 through the system bus 140. The second memory controller 120 may receive the setting information of the predetermined memory of the first memory controller 110, provide and set an enabling register according to the setting information of the predetermined memory, and generate an enabling signal.

For example, the second memory controller 120 may provide and set the enabling register according to the virtual memory address, the size of the predetermined memory, the locked value and the enabled value in the setting information of the predetermined memory. Then, after the setting of the enabling register is completed, the second memory controller 120 may generate an enabling signal. In the embodiment, the second memory controller 120 may be a volatile memory (VM) controller, such as a random access memory (RAM) controller.

The memory access controller 130 is coupled to the system bus 140. The memory access controller 130 is coupled to and communicates with the first memory controller 110 and the second memory controller 120 through the system bus 140. The memory access controller 130 may receive the setting information of the predetermined memory of the first memory controller 110 and the enabling signal generated by the second memory controller 120. Then, the memory access controller 130 may assess the first memory controller 110 and the second memory controller 120 to move the data of the predetermined memory to a predetermined memory space corresponding to the enabling register according to the enabling signal and the setting information of the predetermined memory.

Furthermore, the electronic device 100 may further include a processing unit 150, a first memory 160 and a second memory 170.

The processing unit 150 is coupled to the system bus 140. The processing unit 150 is coupled to and communicates with the first memory controller 110, the second memory controller 120 and the memory access controller 130 through the system bus 140. The processing unit 150 may perform an access operation on the second memory controller 120. For example, the processing unit 150 may control the second memory controller 120 to set the enabling register. In the embodiment, the processing unit 150 is, for example, a micro-processor or a micro-controller, but the embodiment of the present invention is not limited thereto.

The first memory 160 is coupled to the first memory controller 110. The first memory 160 may include the predetermined memory and store the data of the predetermined memory, such as multiple program codes. In the embodiment, the predetermined memory of the first memory 160 may corresponds to the virtual memory address. In addition, the first memory 160 may be a non-volatile memory, such as a flash memory, a read-only memory (ROM), etc., but the embodiment of the present invention is not limited thereto.

The second memory 170 is coupled to the second memory controller 120. The second memory 170 may include the predetermined memory space corresponding to the enabling register. That is, after the second memory controller 120 sets the enabling register according to the setting information of the predetermined memory, the second memory 170 may provide the predetermined memory space corresponding to the enabling register. The predetermined memory space may be set to a read-only mode, and only allow the memory access controller 130 to perform a write operation, so as to move and write the data of the predetermined memory of the first memory 160 to the predetermined memory space.

In the embodiment, the predetermined memory space of the second memory 170 may correspond to the load memory address. In addition, the second memory 170 may be a volatile memory, such as a random access memory, a dynamic random access memory (DRAM), a static random access memory (SRAM) a flip-flop array, etc., but the embodiment of the present invention is not limited thereto.

Furthermore, the second memory controller 120 further includes a filter unit 121. The filter 121 may filter an access operation of the processing unit 150 according to the setting information of the predetermined memory. That is, when the processing unit 150 issues a request of the access operation to the second memory controller 120, the filter unit 121 may filter the above access operation according to the setting information of the predetermined memory, and determine what type the access operation above is, such as an instruction-fetch operation or a data-access operation. In an embodiment, the filter unit 121 may also filter the actions of other active devices on the bus. If the action is data access, this action may also be blocked.

In the overall operation of the electronic device 100, the processing unit 150 may drive the first memory controller 110 to set the first memory 160 to include the predetermined memory, and store the data (such as the program code) in the predetermined memory. Then, the first memory controller 110 may store the setting information of the predetermined memory. For example, the setting information of the predetermined memory includes the virtual memory address (such as the address corresponding to the predetermined memory), the load memory address (such as the address corresponding to the data stored in the predetermined memory), the size of the predetermined memory, the locked value and the enabled value. Afterward, the first memory controller 110 may transmit the setting information of the predetermined memory to the second memory controller 120 and the memory access controller 130.

Then, the processing unit 150 may drive the second memory controller 120, such that the second memory controller 120 may provide and set the enabling register according to the setting information of the predetermined memory (such as the virtual memory address, the size of the predetermined memory, the locked value and the enabled value), and then the second memory 170 may provide the predetermined memory space corresponding to the enabling register, wherein the predetermined memory space corresponds to the virtual memory address and the size of the predetermined memory. In addition, the above predetermined memory space may be set the read-only mode, and only allows the memory access controller 130 to perform the write operation. Furthermore, the characteristic of the execute-only-memory of the predetermined memory space may determine whether to become effective according to the locked value of the setting information of the predetermined memory. Moreover, after the second memory controller 120 may set the enabling register according to the setting information of the predetermined memory, the second memory controller 120 may generate the enabling signal to indicate that the enabling register has been set.

Then, the processing unit 150 may drive the memory access controller 130 (for example, the memory access controller 130 is externally triggered), such that the memory access controller 130 may read the enabling signal generated by the second memory controller 120. Afterward, the memory access controller 130 may access the first memory controller 110 and the second memory controller 120 to move the data of the predetermined memory to the predetermined memory space corresponding to the enabling register according to the enabling signal and the setting information of the predetermined memory (such as the virtual memory address, the load memory address, the size of the predetermined memory). That is, the data of the predetermined memory is read from the first memory 160 according to the load memory address, and then the data of the predetermined memory is written to the predetermined memory space of the second memory 170 corresponding to the enabling register according to the virtual memory address.

Then, in some embodiments, after the above data movement is completed, the memory access controller 130 may generate a completion flag to indicate that the data of the predetermined memory of the first memory 110 has been completely moved to the predetermined memory space of the second memory 170. In some embodiments, after the above data movement is completed, the second memory controller 120 may generate the completion flag to indicate the data of the predetermined memory of the first memory 110 has been completely moved to the predetermined memory space of the second memory 170. Therefore, the second memory 170 may have the function of execute-only-memory. Then, the processing unit 150 may read the above completion flag from the memory access controller 130 or the second memory controller 120. In addition, since the data access speed of the second memory 170 is higher than the data access speed of the first memory, the access speed of the memory may be also increased.

In the above embodiment, a time of moving the data of the predetermined memory to the predetermined memory space corresponding to the enabling register by accessing the first memory controller 110 and the second memory controller 120 through the memory access controller 130 is one, but the embodiment of the present invention is not repeated herein. The memory access controller 130 may support moving the data multiple times. In addition, the number of the predetermined memory of the first memory 160, the enabling register, and the predetermined memory space of the second memory 170 being one is an exemplary embodiment of the present invention, but the embodiment of the present invention is not limited thereto. The user may adjust the number of the predetermined memory of the first memory 160, the enabling register, and the predetermined memory space of the second memory 170 to be more than one according to the requirements thereof, and the same effect may also be achieved.

When the number of the predetermined memory, the enabling register, and the predetermined memory space is more than one, the operations of the memory access controller 130, the first memory controller 110 and the second memory controller 120 may refer to the description of the above embodiment, the same effect may also be achieved, and the description thereof is not repeated herein.

Furthermore, the memory access controller 130 may also check the moved data of the predetermined memory. For example, the memory access controller 130 may use a checksum or a cyclic redundancy check (CRC) to check the moved data of the predetermined memory, so as to verify the correctness of the data.

Figure 3:
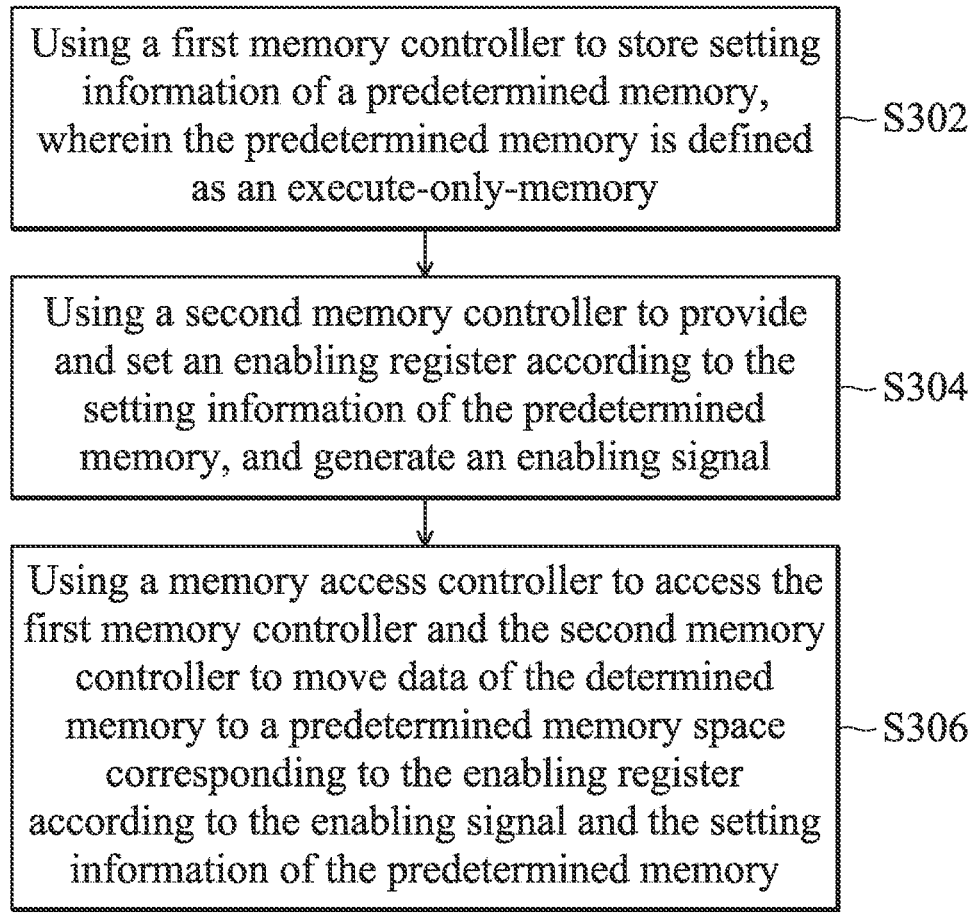
FIG. 3 is a flowchart of an operation method of an electronic device according an embodiment of the present invention.

According to the above-mentioned description, the embodiment of the present invention additionally provides an operation method of an electronic device. FIG. 3 is a flowchart of an operation method of an electronic device according an embodiment of the present invention. In step S302, the method involves using a first memory controller to store setting information of a predetermined memory, wherein the predetermined memory is defined as an execute-only-memory. In step S304, the method involves using a second memory controller to provide and set an enabling register according to the setting information of the predetermined memory, and generate an enabling signal.

In step S306, the method involves using a memory access controller to access the first memory controller and the second memory controller to move data of the determined memory to a predetermined memory space corresponding to the enabling register according to the enabling signal and the setting information of the predetermined memory. In the embodiment, the setting information of the predetermined memory includes a virtual memory address, a load memory address, the size of the predetermined memory, a locked value and an enabled value.

Figure 4:
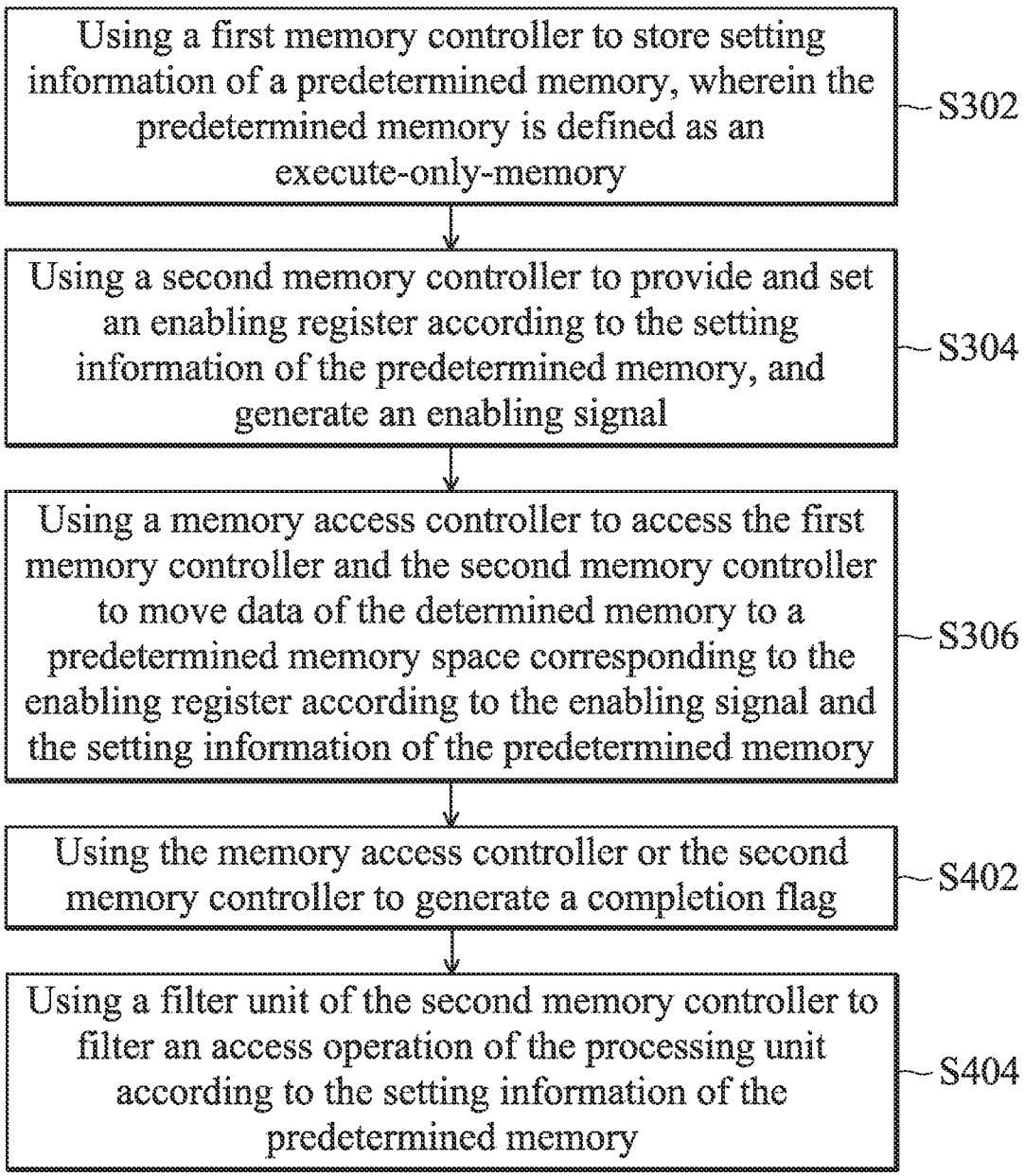
FIG. 4 is a flowchart of an operation method of an electronic device according another embodiment of the present invention.

FIG. 4 is a flowchart of an operation method of an electronic device according another embodiment of the present invention. In the embodiment, steps S302-S306 in FIG. 4 are the same as or similar to steps S302-S306 in FIG. 3. Accordingly, steps S302-S306 in FIG. 4 may refer to the description of the embodiment in FIG. 3, and the description thereof is not repeated herein.

In step S402, the method involves using the memory access controller or the second memory controller to generate a completion flag. In step S404, the method involves using a filter unit of the second memory controller to filter an access operation of the processing unit according to the setting information of the predetermined memory.

It should be noted that the order of the steps of FIG. 3 and FIG. 4 is only for illustrative purpose, but not intended to limit the order of the steps of the present invention. The user may change the order of the steps above according the requirement thereof. The flowcharts described above may add additional steps or use fewer steps without departing from the spirit and scope of the present invention.

In summary, according to the electronic device and the operation method thereof disclosed by the embodiment of the present invention, the first memory controller stores the setting information of the predetermined memory, wherein the predetermined memory is defined as the execute-only-memory. The second memory controller provides and sets the enabling register according to the setting information of the predetermined memory, and generates the enabling signal. The memory access controller accesses the first memory controller and the second memory controller to move the data of the predetermined memory to the predetermined memory space corresponding to the enabling register according to the enabling signal and the setting information of the predetermined memory. Therefore, the memory corresponding to the second memory controller may have the function of execute-only-memory, and the access speed of the memory and the convenience of use may be increased.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a first memory controller, configured to store setting information of a predetermined memory, wherein the predetermined memory is defined as an execute-only-memory;
   a first memory, coupled to the first memory controller, wherein the first memory comprises the predetermined memory, and stores data of the predetermined memory;
   a second memory controller, coupled to the first memory controller, and configured to set an enabling register of the second memory controller and a predetermined memory space corresponding to the enabling register according to the setting information of the predetermined memory, and generate an enabling signal, wherein the enabling signal indicates that the enabling register has been set;
   a second memory, coupled to the second memory controller, wherein the second memory comprises the predetermined memory space corresponding to the enabling register; and
   a memory access controller, coupled to the first memory controller and the second memory controller, and configured to access the first memory controller and the second memory controller to move the data of the predetermined memory of the first memory to the predetermined memory space of the second memory corresponding to the enabling register according to the enabling signal and the setting information of the predetermined memory;
   wherein the predetermined memory space is set to a read-only mode, and only allows the memory access controller to perform a write operation when moving the data of the predetermined memory of the first memory to the predetermined memory space of the second memory corresponding to the enabling register.

2. The electronic device as claimed in claim 1, further comprising:
   a processing unit, coupled to the second memory controller, and configured to perform an access operation on the second memory controller.

3. The electronic device as claimed in claim 2, wherein the second memory controller comprises:
   a filter unit, configured to filter the access operation of the processing unit according to the setting information of the predetermined memory.

4. The electronic device as claimed in claim 1, wherein the setting information of the predetermined memory comprises a virtual memory address, a load memory address, a size of the predetermined memory, a locked value and an enabled value, wherein the load memory address is a first base address where the program code of the predetermined memory is placed in the first memory, and the virtual memory address is a second base address where the program code of the predetermined memory is placed in the second memory.

5. The electronic device as claimed in claim 1, wherein the memory access controller supports moving the data multiple times for the data of the predetermined memory, and checks the moved data of the predetermined memory.

6. The electronic device as claimed in claim 1, wherein after the data of the predetermined memory is moved to the predetermined memory space corresponding to the enabling register, the memory access controller or the second memory controller generates a completion flag.

7. An operation method of an electronic device, comprising:
   using a first memory controller to store setting information of a predetermined memory, wherein the predetermined memory is defined as an execute-only-memory;
   providing a first memory couple to the first memory controller, wherein the first memory comprises the predetermined memory, and stores data of the predetermined memory;
   using a second memory controller to set an enabling register of the second memory controller and a predetermined memory space corresponding to the enabling register according to the setting information of the predetermined memory, and generate an enabling signal, wherein the enabling signal indicates that the enabling register has been set;
   providing a second memory couple to the second memory controller, wherein the second memory comprises the predetermined memory space corresponding to the enabling register; and
   using a memory access controller to access the first memory controller and the second memory controller to move the data of the predetermined memory of the first memory to the predetermined memory space of the second memory corresponding to the enabling register according to the enabling signal and the setting information of the predetermined memory;
   wherein the predetermined memory space is set to a read-only mode, and only allows the memory access controller to perform a write operation when moving the data of the predetermined memory of the first memory to the predetermined memory space of the second memory corresponding to the enabling register.

8. The operation method of the electronic device as claimed in claim 7, wherein the setting information for the predetermined memory comprises a virtual memory address, a load memory address, a size of the predetermined memory, a locked value and an enabled value, wherein the load memory address is a first base address where the program code of the predetermined memory is placed in the first memory, and the virtual memory address is a second base address where the program code of the predetermined memory is placed in the second memory.

9. The operation method of the electronic device as claimed in claim 7, further comprising:
using a filter unit of the second memory controller to filter an access operation of the processing unit according to the setting information of the predetermined memory.

10. The operation method of the electronic device as claimed in claim 7, wherein after the step of moving the data of the predetermined memory to the predetermined memory space corresponding to the enabling register, the operation method further comprises:
using the memory access controller or the second memory controller to generate a completion flag.

* * * * *